(12) United States Patent
Peng et al.

(10) Patent No.: US 11,349,517 B2
(45) Date of Patent: May 31, 2022

(54) PHONE GRAVITY HOLDER

(71) Applicant: SHENZHEN DIYIWEI ELECTRONICS CO., LTD., Guangdong (CN)

(72) Inventors: Kangda Peng, Guangdong (CN); Guanping Pan, Guangdong (CN)

(73) Assignee: SHENZHEN DIYIWEI ELECTRONICS CO., LTD., Shenzhen (CN)

(*) Notice: Subject to any disclaimer, the term of this patent is extended or adjusted under 35 U.S.C. 154(b) by 0 days.

(21) Appl. No.: 17/257,439

(22) PCT Filed: Jul. 18, 2019

(86) PCT No.: PCT/CN2019/096487
§ 371 (c)(1),
(2) Date: Dec. 31, 2020

(87) PCT Pub. No.: WO2020/015696
PCT Pub. Date: Jan. 23, 2020

(65) Prior Publication Data
US 2021/0367638 A1    Nov. 25, 2021

(30) Foreign Application Priority Data

Jul. 19, 2018 (CN) .......................... 201821147492.7

(51) Int. Cl.
*H04B 1/38* (2015.01)
*H04B 1/3877* (2015.01)
*F16M 11/04* (2006.01)

(52) U.S. Cl.
CPC ......... *H04B 1/3877* (2013.01); *F16M 11/041* (2013.01); *F16M 2200/066* (2013.01)

(58) Field of Classification Search
CPC ............... H04B 1/3877; F16M 11/041; F16M 2200/066; H04M 1/04
(Continued)

(56) References Cited

U.S. PATENT DOCUMENTS 9,161,466 B2 * 10/2015 Huang ................. F16M 11/041
9,919,659 B2 * 3/2018 Kipp ..................... B60N 2/2222
(Continued)

FOREIGN PATENT DOCUMENTS

| CN | 206743331 U | 12/2017 |
|---|---|---|
| CN | 206820810 U | 12/2017 |
| CN | 107635043 A | 1/2018 |

OTHER PUBLICATIONS

International Search Report of PCT Patent Application No. PCT/CN2019/096487 dated Sep. 26, 2019.

*Primary Examiner* — Muhammad Ijaz

(57) ABSTRACT

A phone gravity holder comprises a base, a pull rod configured to hold the phone, and a left clamping arm and a right clamping arm configured to clamp the phone, wherein the base is provided with a positioning shaft, the left clamping arm and the right clamping arm are both mounted on the positioning shaft in a rotatable manner, and the pull rod is respectively in transmission connection with the left clamping arm and the right clamping arm, respectively. When the phone is used, the phone is directly placed on the pull rod, and under the gravity effect of the phone, the pull rod drives the left clamping arm and the right clamping arm to rotate in reverse to clamp the phone. The phone can be clamped automatically by utilizing the gravity of the phone and simple mechanical principles, the structure is simple, and the production cost is greatly reduced.

10 Claims, 3 Drawing Sheets

(58) Field of Classification Search
USPC .................. 379/466, 454, 455; 248/122.1
See application file for complete search history.

(56) References Cited

U.S. PATENT DOCUMENTS

| | | | |
|---|---|---|---|
| 10,533,699 B2* | 1/2020 | Yang .................... | H04B 1/3877 |
| 10,663,104 B2* | 5/2020 | Yang .................... | H04B 1/3877 |
| 2012/0025036 A1* | 2/2012 | Huang ................ | F16M 11/041 |
| | | | 248/122.1 |
| 2012/0312936 A1* | 12/2012 | Huang ................ | F16M 11/041 |
| | | | 248/316.1 |
| 2014/0263931 A1* | 9/2014 | Chen ...................... | F16M 13/00 |
| | | | 248/576 |
| 2017/0188724 A1* | 7/2017 | Lin ........................ | F16M 13/00 |
| 2018/0252358 A1* | 9/2018 | Yang ...................... | B60R 11/02 |

* cited by examiner

PHONE GRAVITY HOLDER

TECHNICAL FIELD

The present invention relates to the field of phone accessories, in particular to a phone gravity holder.

BACKGROUND ART

With the popularization of smart phones, drivers most often need to use the phone for navigation or for other phone operations during driving, and then phone holders emerge at the right moment. While for the existing phone holder, the phone is automatically clamped mainly through an electric manner, the structure is complex, and is easily in fault, and the production cost is high. Therefore, the existing phone holder needs to be further improved.

SUMMARY OF THE INVENTION

The technical problem to be solved in the present invention is to provide a phone gravity holder, aiming at solving the problems of complex structure and high production cost of the existing phone holder.

Technical solutions adopted in the present invention to solve its technical problems are as follows: a phone gravity holder is provided, including a base, a pull rod configured to hold the phone, and a left clamping arm and a right clamping arm configured to clamp the phone, wherein the base is provided with a positioning shaft, the left clamping arm and the right clamping arm are both mounted on the positioning shaft in a rotatable manner, and the pull rod is respectively in transmission connection with the left clamping arm and the right clamping arm, respectively; and under the gravity effect of the phone, the pull rod drives the left clamping arm and the right clamping arm to rotate in reverse.

Further, the left clamping arm includes a left clamping rod and a first clamping part configured to clamp the phone, the first clamping part is mounted at one end of the left clamping rod in a rotatable manner, and the other end of the left clamping rod is mounted freely on the pull rod through a first connecting rod; the right clamping arm includes a right clamping rod and a second clamping part configured to clamp the phone, the second clamping part is mounted at one end of the right clamping rod in a rotatable manner, and the other end of the right clamping rod is mounted freely on the pull rod through a second connecting rod.

Further, one end of the first connecting rod is mounted on the left clamping rod in a rotatable manner, the other end is provided with a first gear, the first gear is mounted on the pull rod in a rotatable manner, one end of the second connecting rod is mounted on the right clamping rod in a rotatable manner, the other end is provided with a second gear, and the second gear is mounted on the pull rod in a rotatable manner and is engaged with the first gear.

Further, the first connecting rod and the second connecting rod have the same length, and the left clamping rod and the right clamping rod have the same length.

Further, the first clamping part and the second clamping part are both rollers or U-shaped clamping blocks.

Further, the left clamping rod is closer to the base relative to the right clamping rod, the end of the left clamping rod for mounting the first clamping part is bent towards a direction far away from the base, and the end of the right clamping rod for mounting the second clamping part is bent towards a direction close to the base, such that the first clamping part and the second clamping part are arranged on a same plane.

Further, the phone gravity holder further includes an elastic recovery part, the elastic recovery part is respectively connected with the base and the pull rod, and the pull rod moves downwards under the gravity effect of the phone; after the phone is taken away, the pull rod moves upwards under the effect of the elastic recovery part.

Further, the phone gravity holder further includes a third connecting rod, a fourth connecting rod, a fifth connecting rod and a sixth connecting rod, one end of the third connecting rod is provided with a third gear, the third gear is mounted on the base in a rotatable manner, the other end of the third connecting rod is connected with one end of the fourth connecting rod in a rotatable manner, the other end of the fourth connecting rod is provided with a fourth gear, and the fourth gear is mounted on the pull rod in a rotatable manner; one end of the fifth connecting rod is provided with a fifth gear, the fifth gear is mounted on the pull rod in a rotatable manner and is engaged with the fourth gear, the other end of the fifth connecting rod is connected with one end of the sixth connecting rod in a rotatable manner, the other end of the sixth connecting rod is provided with a sixth gear, and the sixth gear is mounted on the base in a rotatable manner and is engaged with the third gear.

Further, the third connecting rod, the fourth connecting rod, the fifth connecting rod and the sixth connecting rod have the same length.

Further, the pull rod includes a fixed plate and a carrying part for holding the phone, the fourth connecting rod and the fifth connecting rod are mounted on one side of the fixed plate in a rotatable manner, and the carrying part is mounted on the other side of the fixed plate.

Compared with the prior art, the present invention provides a phone gravity holder. When the phone is used, the phone is directly placed on the pull rod, and under the gravity effect of the phone, the pull rod drives the left clamping arm and the right clamping arm to rotate in reverse to clamp the phone. The phone can be clamped automatically by utilizing the gravity of the phone and simple mechanical principles, the structure is simple, and the production cost is greatly reduced.

BRIEF DESCRIPTION OF THE DRAWINGS

The present invention will be further described below in combination with accompanying drawings and embodiments, in the figures.

DETAILED DESCRIPTION OF THE EMBODIMENTS

Preferred embodiments of the present invention will be described in detail below in combination with accompanying drawings.

Figure 1:
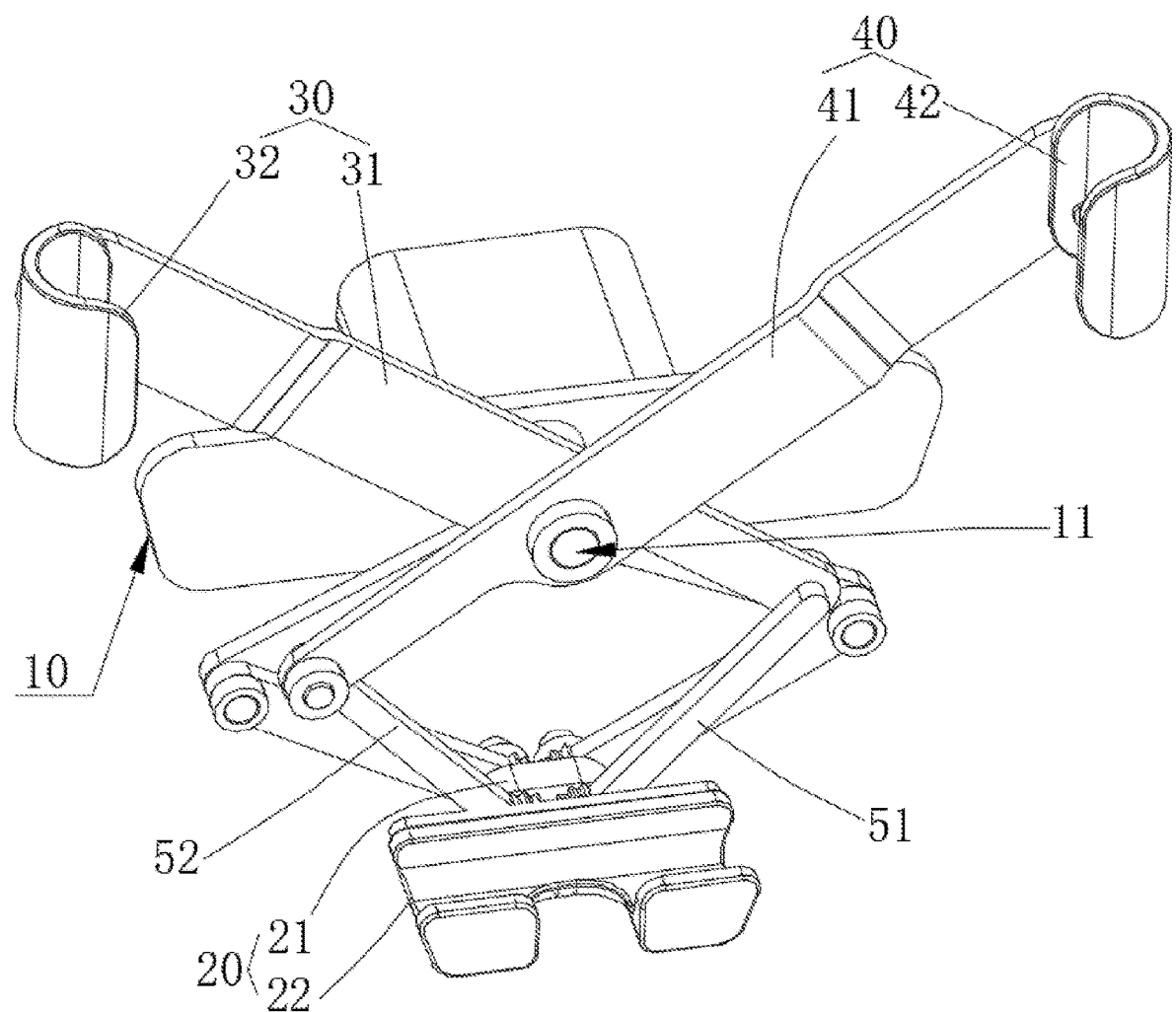
FIG. 1 is a three-dimensional schematic diagram of a phone gravity holder provided in the present invention.
Figure 2:
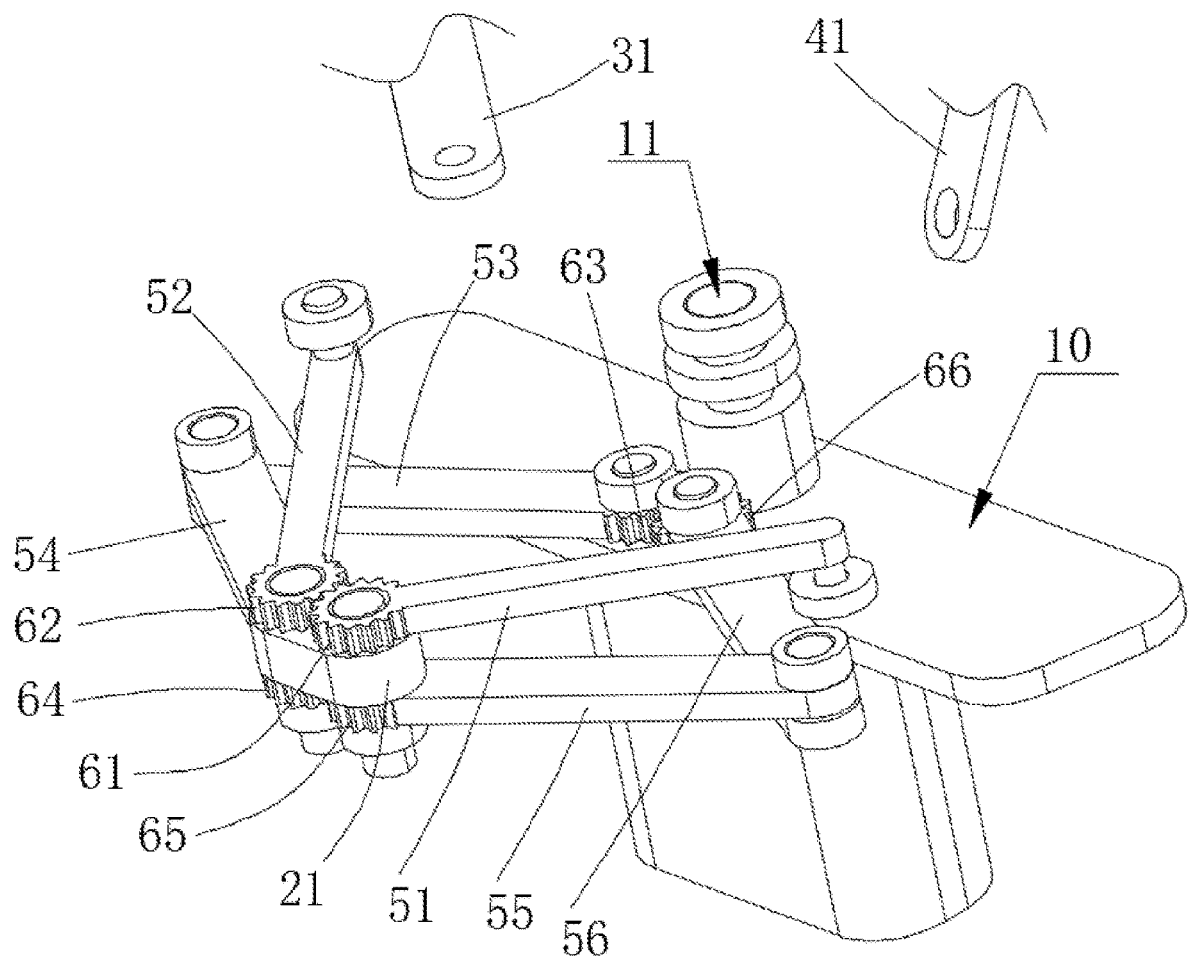
FIG. 2 is an exploded schematic diagram of a phone gravity holder in FIG. 1.

As shown in FIG. 1 and FIG. 2, the present invention provides a phone gravity holder, including a base 10, a pull rod 20 configured to hold the phone, and a left clamping arm 30 and a right clamping arm 40 configured to clamp the phone. The base 10 is provided with a positioning shaft 11, the left clamping arm 30 and the right clamping arm 40 are both mounted on the positioning shaft 11 in a rotatable manner, and the pull rod 20 is respectively in transmission connection with the left clamping arm 30 and the right clamping arm 40, respectively; when the phone is used, the phone is directly placed on the pull rod 20, and under the gravity effect of the phone, the pull rod 20 drives the left clamping arm 30 and the right clamping arm 40 to rotate in reverse to clamp the phone. The phone can be clamped automatically by utilizing the gravity of the phone and simple mechanical principles, the structure is simple, and the production cost is greatly reduced.

Further, the left clamping arm 30 includes a left clamping rod 31 and a first clamping part 32 configured to clamp the phone, the first clamping part 32 is mounted at one end of the left clamping rod 31 in a rotatable manner, and the other end of the left clamping rod 31 is mounted on the pull rod 20 in a rotatable manner through a first connecting rod 51. The right clamping arm 40 includes a right clamping rod 41 and a second clamping part 42 configured to clamp the phone, the second clamping part 42 is mounted at one end of the right clamping rod 41 in a rotatable manner, and the other end of the right clamping rod 41 is mounted on the positioning shaft 11 in a rotatable manner through a second connecting rod 52. Under the gravity effect of the phone, the pull rod 20 drives the left clamping arm 30 and the right clamping arm 40 to rotate in reverse, such that the first clamping part 32 and the second clamping part 42 can be adjacent to each other to clamp the phone.

In the present embodiment, the first clamping part 32 and the second clamping part 42 are both U-shaped clamping blocks. Wherein the U-shaped groove of the U-shaped clamping block is adapted to the side edge of the phone, and the clamping is more stable. The U-shaped clamping block can also be provided with a cushion to protect the phone. Of course, the first clamping part 32 and the second clamping part 42 can also be rollers, the rollers can be rubber rollers, have a buffer effect, and can also protect and clamp the phone.

Further, one end of the first connecting rod 51 is mounted on the left clamping rod 31 in a rotatable manner, the other end is provided with a first gear 61, the first gear 61 is mounted on the pull rod 20 in a rotatable manner, one end of the second connecting rod 52 is mounted on the right clamping rod 41 in a rotatable manner, the other end is provided with a second gear 62, and the second gear 62 is mounted on the pull rod 20 in a rotatable manner and is engaged with the first gear 61. Through mutual engagement of the first gear 61 and the second gear 62, not only the left clamping rod 31 and the right clamping rod 41 can rotate synchronously, but also the shaking of the left clamping rod 31 and the right clamping rod 41 can be reduced. Wherein, the first connecting rod 51 and the second connecting rod 52 have the same length, the left clamping rod 31 and the right clamping rod 41 have the same length, when the pull rod 20 moves for a distance, the left clamping rod 31 and the right clamping rod 41 rotate for the same angle, such that the first clamping part 32 and the second clamping part 42 clamp the phone simultaneously.

Since the left clamping rod 31 and the right clamping rod 41 are mounted on the positioning shaft 11 in a crossed manner, the left clamping rod 31 is closer to the base 10 relative to the right clamping rod 41, under normal conditions, the first clamping part 32 and the second clamping part 42 are not on the same plane, thereby being not beneficial to clamping the phone. Therefore, one end of the left clamping rod 31 for mounting the first clamping part 32 is bent towards the direction far away from the base 10, and one end of the right clamping rod 41 for mounting the second clamping part 42 is bent towards the direction close to the base 10, such that the first clamping part 32 and the second clamping part 42 are arranged on the same plane, thereby being beneficial for clamping the phone.

Since the pull rod 20 is not mounted on the base 10, the pull rod 20 will shake. To solve the problem, the phone gravity holder further includes a third connecting rod 53, a fourth connecting rod 54, a fifth connecting rod 55 and a sixth connecting rod 56, one end of the third connecting rod 53 is provided with a third gear 63, the third gear 63 is mounted on the base 10 in a rotatable manner, the other end of the third connecting rod 53 is connected with one end of the fourth connecting rod 54 in a rotatable manner, the other end of the fourth connecting rod 54 is provided with a fourth gear 64, and the fourth gear 64 is mounted on the pull rod 20 in a rotatable manner. One end of the fifth connecting rod 55 is provided with a fifth gear 65, the fifth gear 65 is mounted on the pull rod 20 in a rotatable manner and is engaged with the fourth gear 64, the other end of the fifth connecting rod 55 is connected with one end of the sixth connecting rod 56 in a rotatable manner, the other end of the sixth connecting rod 56 is provided with a sixth gear 66, the sixth gear 66 is mounted on the base 10 in a rotatable manner and is engaged with the third gear 63. Since the fifth gear 65 is engaged with the fourth gear 64, the sixth gear 66 is engaged with the third gear 63, such that the pull rod 20 can only move up and down, and cannot shake left and right, thereby greatly enhancing overall stability.

In the present embodiment, the third connecting rod 53, the fourth connecting rod 54, the fifth connecting rod 55 and the sixth connecting rod 56 have the same length, thereby ensuring that the pull rod 20 moves up and down along a straight line.

Figure 3:
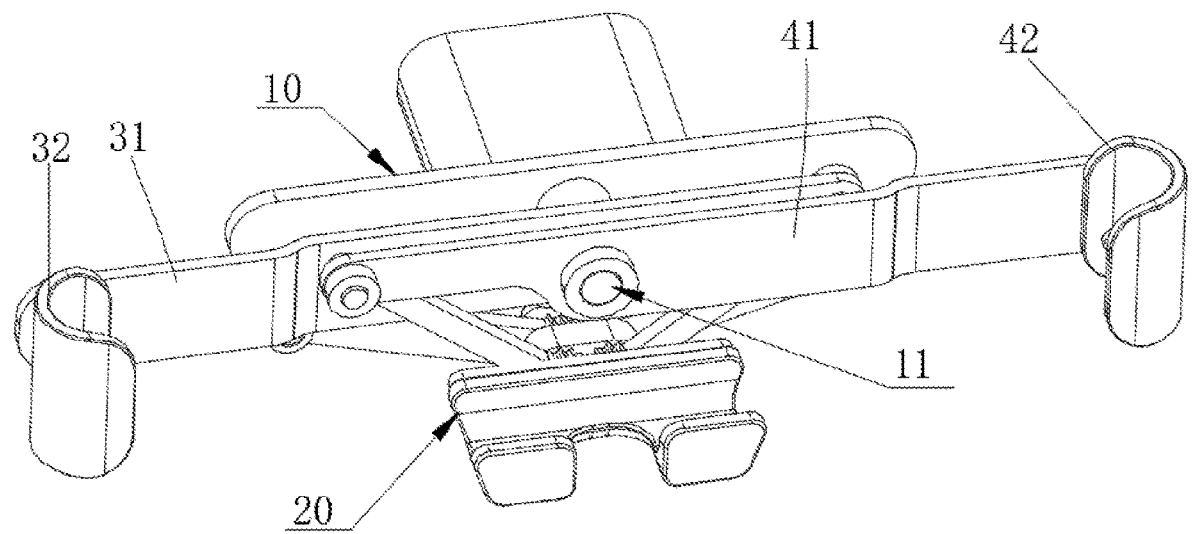
FIG. 3 is a schematic diagram of an initial state of a phone gravity holder in FIG. 1.

The pull rod 20 includes a fixed plate 21 and a carrying part 22 configured to hold a phone, the fourth connecting rod 54 and the fifth connecting rod 55 are mounted on one side of the fixed plate in a rotatable manner, the carrying part 22 is mounted on the other side of the fixed plate 21, and can move along with the fixed plate 21. The first connecting rod 51 and the second connecting rod 52 are also mounted on the other side of the fixed plate in a rotatable manner, such that the structure is compact, and the first connecting rod 51 and the second connecting rod 52 will not interfere with each other. In consideration of the length of the phone, the fixed plate 21 in FIG. 3 is set to be a short plate. Of course, the fixed plate 21 can also be a long plate, and can be set according to actual requirements.

Further, the phone gravity holder further includes an elastic recovery part (not shown in the figure), and the elastic recovery part is respectively connected with the base 10 and the pull rod 20. During use, the phone is placed on the carrying part 22, the pull rod 20 moves downwards under the gravity effect of the phone, the left clamping rod 31 is driven by the first connecting rod 51 to rotate clockwise, meanwhile, the right clamping rod 41 is driven by the second connecting rod 52 to rotate anticlockwise, such that the first clamping part 32 and the second clamping part 42 are adjacent to each other to clamp the phone. After the phone is taken away, the pull rod 20 moves upwards under the effect of the elastic recovery part, the left clamping rod 31 is driven by the first connecting rod 51 to rotate anticlockwise, meanwhile, the right clamping rod 41 is driven by the second connecting rod 52 to rotate clockwise, such that the first clamping part 32 and the second clamping part 42 are away from each other and recover to the initial state, to wait for the placement of the phone next time. As shown in FIG. 3, in the initial state, the left clamping rod 31 and the right clamping rod 41 are arranged on the same straight line, and the first clamping part 32 and the second clamping part 42 are farthest apart. Wherein the elastic recovery part is preferably spring.

During actual production, the base 10 can be a housing, the left clamping arm 30, the right clamping arm 40 and the pull rod 20 extend out of the housing, and the phone is abutted against the housing, such that the phone can be clamped to use.

It should be understood that, the above embodiments are merely used for illustrating technical solutions of the present invention, rather than for limiting the present invention. For those skilled in the art, the technical solutions recorded in the above embodiments can be modified, or part of the technical features can be equivalently substituted; while all these modifications and substitutions shall all fall within the protection scope of the appended claims of the present invention.

The invention claimed is:

1. A phone holder, comprising a base, a pull rod configured to hold the phone, and a left clamping arm and a right clamping arm configured to clamp the phone, wherein the base is provided with a positioning shaft, the left clamping arm comprises a left clamping rod and a first clamping part configured to clamp the phone, the first clamping part is mounted at an end of the left clamping rod in a rotatable manner, and the other end of the left clamping rod is in transmission connection with the pull rod; the right clamping arm comprises a right clamping rod and a second clamping part configured to clamp the phone, the second clamping part is mounted at one end of the right clamping rod in a rotatable manner, and the other end of the right clamping rod is in transmission connection with the pull rod; the left clamping rod and the right clamping rod are mounted on the positioning shaft in a rotatable and crossed manner; and due to the phone's gravity, the pull rod drives the left clamping rod and the right clamping rod to rotate in reverse, such that the first clamping part and the second clamping part can be adjacent to each other to clamp the phone.

2. The phone holder of claim 1, wherein the end of the left clamping rod away from the first clamping part is mounted freely on the pull rod through a first connecting rod; and the end of the right clamping rod away from the second clamping part is mounted freely on the pull rod through a second connecting rod.

3. The phone holder of claim 2, wherein one end of the first connecting rod is mounted on the left clamping rod in a rotatable manner, the other end is provided with a first gear, the first gear is mounted on the pull rod in a rotatable manner, one end of the second connecting rod is mounted on the right clamping rod in a rotatable manner, the other end is provided with a second gear, and the second gear is mounted on the pull rod in a rotatable manner and is engaged with the first gear.

4. The phone holder of claim 2, wherein the first connecting rod and the second connecting rod have the same length, and the left clamping rod and the right clamping rod have the same length.

5. The phone holder of claim 2, wherein the first clamping part and the second clamping part are both rollers or U-shaped clamping blocks.

6. The phone holder of claim 2, wherein the left clamping rod is closer to the base relative to the right clamping rod, the end of the left clamping rod for mounting the first clamping part is bent towards a direction far away from the base, and the end of the right clamping rod for mounting the second clamping part is bent towards a direction close to the base, such that the first clamping part and the second clamping part are arranged on a same plane.

7. The phone holder of claim 1, wherein the phone holder further comprises an elastic recovery part, the elastic recovery part is respectively connected with the base and the pull rod, and the pull rod moves downwards due to the phone's gravity; after the phone is taken away, the pull rod moves upwards under the effect of the elastic recovery part.

8. The phone holder of claim 1, wherein the phone holder further comprises a third connecting rod, a fourth connecting rod, a fifth connecting rod and a sixth connecting rod, one end of the third connecting rod is provided with a third gear, the third gear is mounted on the base in a rotatable manner, the other end of the third connecting rod is connected with one end of the fourth connecting rod in a rotatable manner, the other end of the fourth connecting rod is provided with a fourth gear, and the fourth gear is mounted on the pull rod in a rotatable manner; one end of the fifth connecting rod is provided with a fifth gear, the fifth gear is mounted on the pull rod in a rotatable manner and is engaged with the fourth gear, the other end of the fifth connecting rod is connected with one end of the sixth connecting rod in a rotatable manner, the other end of the sixth connecting rod is provided with a sixth gear, and the sixth gear is mounted on the base in a rotatable manner and is engaged with the third gear.

9. The phone gravity holder of claim 8, wherein the third connecting rod, the fourth connecting rod, the fifth connecting rod and the sixth connecting rod have the same length.

10. The phone holder of claim 9, wherein the pull rod comprises a fixed plate and a carrying part for holding the phone, the fourth connecting rod and the fifth connecting rod are mounted on one side of the fixed plate in a rotatable manner, and the carrying part is mounted on the other side of the fixed plate.

* * * * *